United States Patent
Baehrle-Miller et al.

(10) Patent No.: US 8,938,347 B2
(45) Date of Patent: Jan. 20, 2015

(54) METHOD FOR ADJUSTING THE CLAMPING FORCE EXERTED BY A PARKING BRAKE

(75) Inventors: Frank Baehrle-Miller, Schoenaich (DE); Dieter Blattert, Kirchheim/Neckar (DE); Lars Roters, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/822,212

(22) PCT Filed: Jul. 18, 2011

(86) PCT No.: PCT/EP2011/062274
§ 371 (c)(1),
(2), (4) Date: May 16, 2013

(87) PCT Pub. No.: WO2012/031806
PCT Pub. Date: Mar. 15, 2012

(65) Prior Publication Data
US 2013/0226427 A1    Aug. 29, 2013

(30) Foreign Application Priority Data
Sep. 10, 2010 (DE) .......................... 10 2010 040 572

(51) Int. Cl.
| B60T 7/12 | (2006.01) |
| B60T 7/10 | (2006.01) |
| B60T 13/74 | (2006.01) |
| F16D 65/18 | (2006.01) |
| F16D 121/02 | (2012.01) |
| F16D 121/24 | (2012.01) |

(52) U.S. Cl.
CPC . *B60T 7/12* (2013.01); *B60T 7/107* (2013.01); *B60T 13/745* (2013.01); *F16D 65/18* (2013.01); *F16D 2121/02* (2013.01); *F16D 2121/24* (2013.01)
USPC ......................................................... 701/70

(58) Field of Classification Search
CPC ......... B60T 13/745; B60T 13/74; B60T 7/12; B60T 8/17; B60T 8/172
USPC ............................................................ 701/70
See application file for complete search history.

(56) References Cited

U.S. PATENT DOCUMENTS

| 8,521,388 | B2 * | 8/2013 | Baehrle-Miller et al. ...... 701/70 |
| 2006/0267402 | A1 * | 11/2006 | Leiter et al. ..................... 303/20 |

FOREIGN PATENT DOCUMENTS

| DE | 101 04 498 | | 8/2002 | |
| DE | 10104498 | A1 * | 8/2002 | ............... B60T 7/12 |
| DE | 103 45 485 | | 4/2005 | |
| DE | 10345485 | A1 * | 5/2005 | ............. B60T 13/16 |
| DE | 10 2005 001838 | | 8/2006 | |
| DE | 10 2005 042282 | | 3/2007 | |
| DE | 10 2005 046991 | | 4/2007 | |

(Continued)

*Primary Examiner* — Mary Cheung
*Assistant Examiner* — Brian P Sweeney
(74) *Attorney, Agent, or Firm* — Kenyon & Kenyon LLP

(57) ABSTRACT

In a method for adjusting the clamping force exerted by a parking brake, which force is applied by an electric-motor braking apparatus and by a hydraulic braking apparatus, the hydraulic inlet pressure generated by the driver and existing in the hydraulic braking apparatus is utilized to generate a hydraulic clamping force; and for the case in which the hydraulic clamping force is not sufficient to reach a target clamping force, an electric clamping force is generated in supplementary fashion.

9 Claims, 1 Drawing Sheet

(56) References Cited

FOREIGN PATENT DOCUMENTS

| DE | 10 2006 016543 | 10/2007 |
| WO | 2005/042320 | 5/2005 |
| WO | 2005/073043 | 8/2005 |
| WO | 2006/067196 | 6/2006 |

* cited by examiner

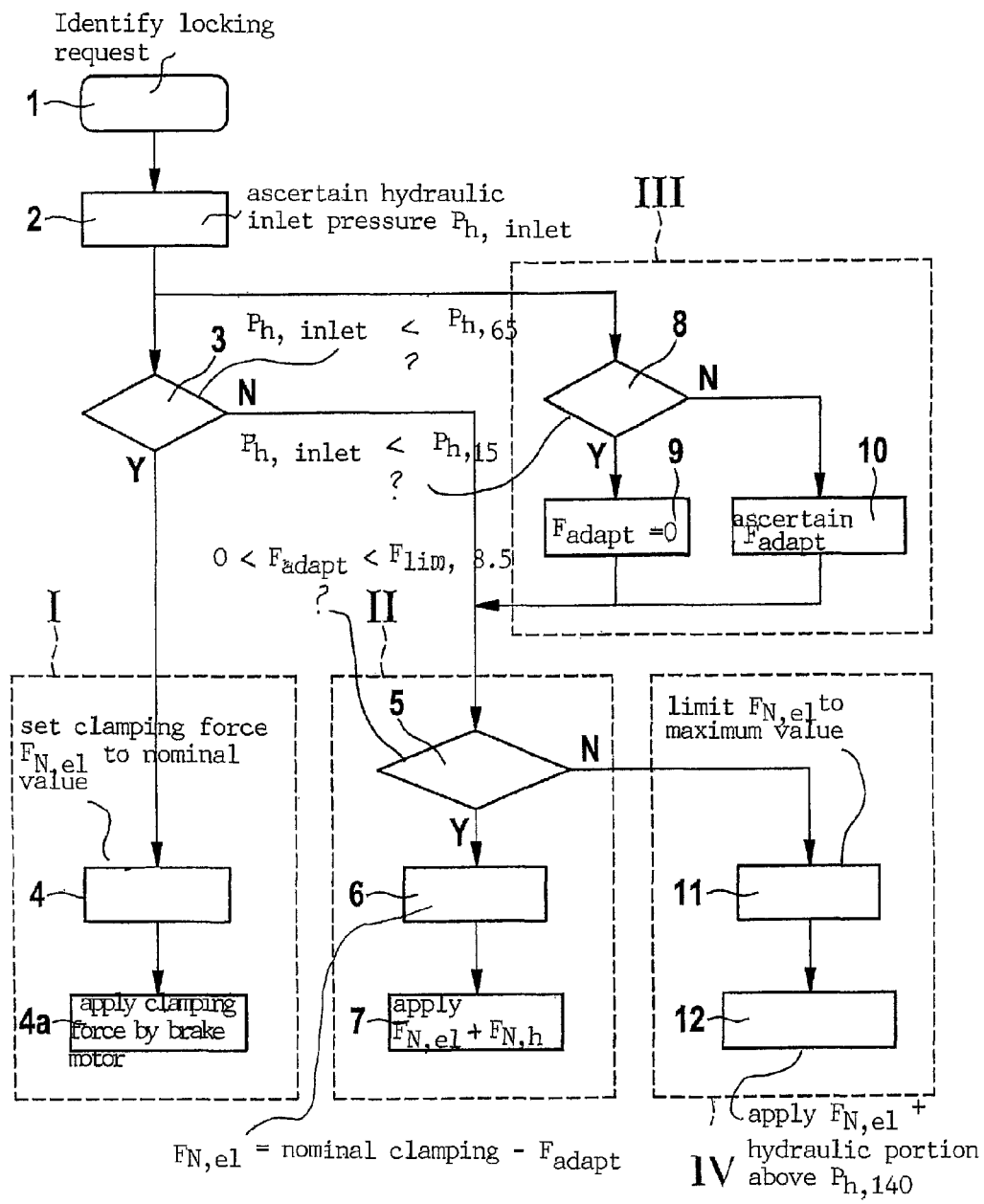

METHOD FOR ADJUSTING THE CLAMPING FORCE EXERTED BY A PARKING BRAKE

FIELD OF THE INVENTION

The present invention relates to a method for adjusting the clamping force exerted by a parking brake in a vehicle.

BACKGROUND INFORMATION

Parking brakes in vehicles, with which a vehicle can be continuously immobilized at a standstill by generating a constant clamping force, are known. Parking brakes can encompass an electric brake motor whose positioning motion acts via a linkage, for example a spindle drive, directly on the brake pistons at the hydraulic wheel brakes. The electric brake motor is dimensioned so that up to a specific slope angle, the vehicle can be held exclusively via the braking effect of the brake motor. For slope angles beyond that, an additional, hydraulic braking force is generated by actuating the hydraulic wheel brake device.

SUMMARY OF THE INVENTION

An underlying object of the invention is to make the application or clamping force in the parking brake of a vehicle available in economical fashion, and at the same time to decrease the stress on the parking brake.

This object may be achieved according to the present invention with the features described herein. The further descriptions herein indicate useful refinements.

The method according to the present invention serves to adjust the clamping force exerted by a parking brake when a vehicle is at a standstill. The parking brake encompasses an electric-motor braking apparatus having an electric brake motor, and furthermore a hydraulic braking apparatus with which a hydraulic clamping force can be generated. The hydraulic braking apparatus is, advantageously, identical to the hydraulic wheel brake with which the vehicle is decelerated in normal driving operation. The electric brake motor acts on the brake piston of the hydraulic braking apparatus. An adjustable portion of the total clamping force can be generated respectively via the electric and the hydraulic braking apparatus, the respective portion being modifiably adjustable between zero and a maximum value.

In the method according to the present invention, the hydraulic inlet pressure generated by a driver actuation and existing in the hydraulic braking apparatus is utilized, at least within a defined operating range, to generate a hydraulic clamping force. For the case in which the hydraulic clamping force is not sufficient to reach a predefined target clamping force, a clamping force produced in the electric-motor braking apparatus is generated in supplementary fashion. The inlet pressure is generated by a manual intervention by the driver in the hydraulic braking apparatus. If the hydraulic braking apparatus that is a constituent of the parking brake is identical to the hydraulic wheel brake, the driver intervention is the brake pedal actuation by which a hydraulic braking force is generated by the driver, which force can be utilized as an inlet pressure for generating a clamping force in the parking brake.

The hydraulic clamping force and the electric clamping force supplement one another additively to yield the target clamping force that is to be established by the parking brake. This on the one hand ensures that the necessary clamping force is achieved, and on the other hand the stress on the components of the parking brake is decreased, since (at least in specific, defined operating situations) no force exceeding the target clamping force is generated in the electrical or hydraulic braking apparatus. The forces acting on the brake piston are decreased as compared with the existing art.

To ensure that the hydraulic clamping force is continuously active while the vehicle is at a standstill, the electric brake motor is usefully shifted into a position that immobilizes a brake piston of the hydraulic braking apparatus. This applies both for the case in which the clamping force is achieved exclusively via the hydraulic inlet pressure, and also in cases in which the clamping force is generated via a portion from the hydraulic inlet pressure and also via a portion from the electric brake motor. The effect of the hydraulic pressure can thereby be conserved.

If applicable, a hydraulic clamping force exceeding the clamping force that can be made available only on the basis of the hydraulic inlet pressure is generated by a driver-independent actuation of the hydraulic braking apparatus. This occurs in particular in phases in which the necessary target clamping force cannot be achieved solely from the sum of the electric clamping force and the hydraulic clamping force attributable to the inlet pressure, for example with steep slope angles. In standard cases, on the other hand, in which the slope angle does not exceed a defined magnitude of, for example, 20%, a constant target clamping force associated with that slope angle is defined, which force is made available solely from the sum of the electric clamping force and the clamping force attributable to the hydraulic inlet pressure, the electric clamping force portion being adjusted variably or complementarily to the hydraulic clamping force portion.

According to a further useful embodiment, for the case in which the hydraulic inlet pressure is below a first threshold pressure value, the target clamping force is made available entirely via the electric clamping force. What is available in the electric braking apparatus is, in particular, a nominal clamping force that is matched to a specific slope angle of, for example, 20%. The first threshold pressure value is equal to, for example, 65 bar. If the inlet pressure does not exceed the first threshold pressure value, the electric braking apparatus generates the nominal clamping force regardless of the hydraulic clamping force attributable to the inlet pressure, which force combines additively with the electric clamping force to yield the total clamping force.

According to a further useful embodiment, the target clamping force is generated via the hydraulic clamping force, and in supplementary fashion via the electric-motor clamping force, if the hydraulic inlet pressure is between a first threshold pressure value and a second, higher threshold pressure value. The first threshold pressure value is equal to, for example 65 bar; the second threshold pressure value is at, for example, 140 bar. The electric-motor portion of the clamping force participates in supplementary fashion, the level of the electric clamping force being dimensioned so that a required target clamping force is achieved, which force is, as described above, usefully adjusted so that the vehicle can be securely held in place at a standstill on a defined slope angle.

According to yet another useful embodiment, for the case in which the hydraulic inlet pressure exceeds a threshold pressure value, the electric-motor clamping force portion of the target clamping force is reduced by a constant amount. The relevant threshold pressure value is, in particular, identical to the second, upper threshold pressure value, which marks the upper limit of the range in which the electric and the hydraulic clamping forces supplement one another, each at a variable proportion, to yield the target clamping force. The fact that in working ranges above the second threshold pressure value, the portion from the electric-motor clamping force is now reduced not by an amount equal to a variable constituent of the hydraulic inlet pressure, but instead only by a constant amount, ensures that for safety reasons, a minimum electric clamping force is made available even with very high hydraulic inlet pressures. This ensures secure bracing of the brake piston via the electric brake motor and the spindle. The constant amount by which the portion to be supplied by the electric brake motor is reduced usefully corresponds to the hydraulic clamping force that is present at the upper threshold pressure value.

To ascertain the hydraulic inlet pressure, a pressure measurement in the hydraulic braking system of the vehicle is usefully carried out. It can be advantageous to ascertain the inlet pressure, at a hydraulic wheel brake constituting the parking brake, from the inlet pressure of a further wheel brake, in particular by subtracting a pressure tolerance of, for example, 50%. As a rule, the current inlet pressure at the wheel brakes on the front axle of the vehicle is ascertainable via a pressure sensor. If this value is available, the inlet pressure at the wheel brakes on the rear axle of the vehicle, which constitute the parking brake, can be estimated therefrom, optionally in consideration of the pressure tolerance.

The method according to the present invention executes in a closed- or open-loop control device that is a constituent of the parking brake in the vehicle or communicates with the parking brake or with components of the parking brake. The closed- or open-loop control device is optionally a constituent of an electronic stability program (ESP) control device, or constitutes an additional function in an ESP control device, or is made available as an independent control device that can communicate with the ESP control device.

Further advantages and useful embodiments may be gathered from the further descriptions herein, the description of the Figures.

BRIEF DESCRIPTION OF THE DRAWING

The FIGURE shows an execution diagram for carrying out the method for adjusting the clamping force exerted by a parking brake.

DETAILED DESCRIPTION

The execution diagram depicted in the FIGURE refers to a parking brake in a vehicle, which brake encompasses both an electric-motor braking apparatus and a hydraulic braking apparatus, such that a respective clamping force portion for achieving a target clamping force $F_{N,target}$ can be established via the electric-motor and the hydraulic braking apparatus. The electric-motor braking apparatus encompasses an electric brake motor that exerts a positioning force on the brake piston of the hydraulic braking apparatus, the hydraulic braking apparatus being a constituent of the hydraulic wheel brake in the vehicle by which the vehicle can be decelerated in ordinary driving operation.

In a first method step 1, firstly a locking request to the parking brake is identified. In the next method step 2, the hydraulic inlet pressure $p_{h,inlet}$ in the hydraulic braking apparatus, which is a constituent of the parking brake, is ascertained. The hydraulic inlet pressure is the hydraulic pressure generated in the braking apparatus as a result of actuation of the brake pedal by the driver. The hydraulic inlet pressure $p_{h,RA}$ at the wheel brakes on the rear axle of the vehicle (which constitute the parking brake) is ascertained from the hydraulic inlet pressure $p_{h,inlet}$ of the braking system, which is measured with the aid of a pressure sensor. Because the hydraulic pressure at the rear axis can deviate from that at the front axle, for example because of an intervention by an electronic brake differential, a safety deduction for the hydraulic inlet pressure at the rear axle is carried out, equal e.g. to 50%; in this case the hydraulic inlet pressure at the rear axle is equal to only 50% of the hydraulic inlet pressure at the front axle.

In method step 3, a query occurs as to whether the hydraulic inlet pressure $p_{h,inlet}$ falls below a lower, first threshold pressure value $p_{h,65}$. If this is the case, i.e. if the hydraulic inlet pressure is less than the lower threshold pressure value $p_{h,65}$, execution continues along the Yes branch (Y) to the next method steps 4 and 4a, which constitute a first execution block I in which the target clamping force $F_{N,target}$ is made available entirely via the electric clamping force $F_{N,el}$ of the electric brake motor. Any hydraulic clamping force $F_{N,h}$ that may exist, attributable to the hydraulic inlet pressure $p_{n,inlet}$, combines additively with the electric clamping force $F_{N,el}$ to yield a total clamping force $F_N$. The electric braking apparatus nevertheless makes available a nominal clamping force that is directed toward a slope angle having a defined slope of, for example, 20°. In method step 4 the electric clamping force $F_{N,el}$ is accordingly set to the nominal value, and in method step 4a the clamping force is implemented by corresponding application of control to the electric brake motor.

If the result of the query in method step 3 is that the hydraulic inlet pressure $p_{h,inlet}$ is not less than the lower threshold pressure value $p_{h,65}$, execution continues along the No branch (N) to the second execution block having method steps 5 to 7. Execution block II requires, as additional information, the magnitude of a hydraulic portion $F_{adapt}$, which is ascertained in an execution block III that is run through in parallel after method step 2 and contains method steps 8 to 10. In accordance with the query in method step 8, execution block III firstly queries whether the hydraulic inlet pressure $P_{h,inlet}$ is below a lower threshold $p_{h,15}$. If so, execution continues along the Yes branch to method step 9; otherwise to method step 10. In method step 9, the hydraulic portion $F_{adapt}$ is set to a value of zero; in method step 10, the hydraulic portion $F_{adapt}$ is ascertained as a function of the inlet pressure $p_{h,inlet}$, but with subtraction of the pressure at the lower threshold, which is e.g. 15 bar.

The hydraulic portion $F_{adapt}$ ascertained in execution block III flows as additional information into execution block II. There, in a method step 5, a query is started as to whether the hydraulic portion $F_{adapt}$ (present as a force) is within a value range between zero and an upper limit $F_{lim,8.5}$ which marks the value exerted by the hydraulic braking apparatus of the parking brake upon reaching an upper threshold value $p_{h,140}$. If the query in method step 5 is answered positively, i.e. if the hydraulic portion $F_{adapt}$ is within the range marked by the upper limit $F_{lim,8.5}$, execution continues along the Yes branch to method step 6, in which the clamping force $F_{N,el}$ to be effected by the electric brake motor is ascertained as the difference between the nominal clamping force and the hydraulic portion $F_{adapt}$. In the next method step 7, the total clamping force is then established by acting on the electric brake motor with the electric clamping force $F_{N,el}$ ascertained in method step 6, in which context the hydraulic clamping force $F_{N,h}$ attributable to the current inlet pressure $p_{h,inlet}$ in the hydraulic braking system is additionally effective. Method steps 5 to 7 in execution block II thus adapt the electric portion of the clamping force variably to the existing portion of the hydraulic clamping force so as to achieve the target clamping force $F_{N,target}$. The target clamping force $F_{N,target}$ target is set, in particular, to a value such that the vehicle remains securely at a standstill at a defined slope angle of, for example, 20%.

If the result of the query in method step 5 is that the hydraulic portion $F_{adapt}$ exceeds the upper limit $F_{lim,8.5}$, there is also an exceedance of the upper threshold pressure value $p_{h,140}$ of the hydraulic inlet pressure $p_{h,inlet}$. In this case execution continues along the No branch to method step 11, which together with a further method step 12 constitutes an execution block IV. In method step 11, the electric clamping force $F_{N,el}$ is limited to a maximum value that is obtained by subtracting the upper limit $F_{lim,8.5}$ from the nominal clamping force in the context of a defined slope angle of, for example, 20%. In the next method step 12 the total clamping force is then established; this results from the electric-motor portion and the hydraulic portion, the electric-motor portion being established in the electric brake motor as ascertained in method step 11, and the hydraulic portion being based on the current inlet pressure that is above the upper threshold pressure value $p_{h,140}$.

What is claimed is:

1. A method for adjusting a clamping force exerted by a parking brake, which force is applied by an electric-motor braking apparatus that encompasses an electric brake motor, and by a hydraulic braking apparatus, the method comprising:
   using the hydraulic inlet pressure generated by a driver actuation and existing in the hydraulic braking apparatus to generate a non-zero hydraulic clamping force; and
   generating, only for the case in which the non-zero hydraulic clamping force is not sufficient to reach a target clamping force, a clamping force produced in the electric-motor braking apparatus in a supplementary manner;
   wherein for the case in which the hydraulic inlet pressure is below a first threshold pressure value, the target clamping force is made available entirely via a nominal clamping force generated in the electric-motor braking apparatus, and wherein the hydraulic clamping force is combined with the nominal clamping force to produce a total clamping force.

2. The method of claim 1, wherein the electric brake motor is shifted into a position that immobilizes a brake piston of the hydraulic braking apparatus.

3. The method of claim 1, wherein for the case in which the hydraulic inlet pressure is between a first threshold pressure value and a second threshold pressure value, the target clamping force is generated via the hydraulic clamping force and in a supplementary manner via the electric-motor clamping force.

4. The method of claim 3, wherein the first threshold pressure value is identical to the second threshold pressure value.

5. The method of claim 1, wherein the hydraulic inlet pressure is ascertained from the measured pressure at a wheel brake in the vehicle.

6. A method for adjusting a clamping force exerted by a parking brake, which force is applied by an electric-motor braking apparatus that encompasses an electric brake motor, and by a hydraulic braking apparatus, the method comprising:
   using the hydraulic inlet pressure generated by a driver actuation and existing in the hydraulic braking apparatus to generate a non-zero hydraulic clamping force; and
   generating, only for the case in which the non-zero hydraulic clamping force is not sufficient to reach a target clamping force, a clamping force produced in the electric-motor braking apparatus in a supplementary manner;
   wherein for the case in which the hydraulic inlet pressure exceeds a threshold pressure value, the electric-motor clamping force portion of the target clamping force is reduced by a constant amount.

7. The method of claim 6, wherein the constant amount by which the portion to be supplied by the electric brake motor is reduced corresponds to the hydraulic clamping force that is present at the threshold pressure value.

8. A control device, comprising:
   one of a closed loop control arrangement and an open loop control arrangement for adjusting a clamping force exerted by a parking brake, which force is applied by an electric-motor braking apparatus that encompasses an electric brake motor, and by a hydraulic braking apparatus, by performing the following:
      using the hydraulic inlet pressure generated by a driver actuation and existing in the hydraulic braking apparatus to generate a non-zero hydraulic clamping force; and
      generating, only for the case in which the non-zero hydraulic clamping force is not sufficient to reach a target clamping force, a clamping force produced in the electric-motor braking apparatus in a supplementary manner;
      wherein for the case in which the hydraulic inlet pressure is below a first threshold pressure value, the target clamping force is made available entirely via a nominal clamping force generated in the electric-motor braking apparatus, and wherein the hydraulic clamping force is combined with the nominal clamping force to produce a total clamping force.

9. A parking brake in a vehicle, comprising:
   a control device, including:
      one of a closed loop control arrangement and an open loop control arrangement for adjusting a clamping force exerted by a parking brake, which force is applied by an electric-motor braking apparatus that encompasses an electric brake motor, and by a hydraulic braking apparatus, by performing the following:
         using the hydraulic inlet pressure generated by a driver actuation and existing in the hydraulic braking apparatus to generate a non-zero hydraulic clamping force; and
         generating, only for the case in which the non-zero hydraulic clamping force is not sufficient to reach a target clamping force, a clamping force produced in the electric-motor braking apparatus in a supplementary manner;
         wherein for the case in which the hydraulic inlet pressure is below a first threshold pressure value, the target clamping force is made available entirely via a nominal clamping force generated in the electric-motor braking apparatus, and wherein the hydraulic clamping force is combined with the nominal clamping force to produce a total clamping force.

* * * * *